INVENTORS
EDWARD HARPOOTHIAN AND
WILLIAM BAILEY OSWALD
BY Edwin Coates
ATTORNEY

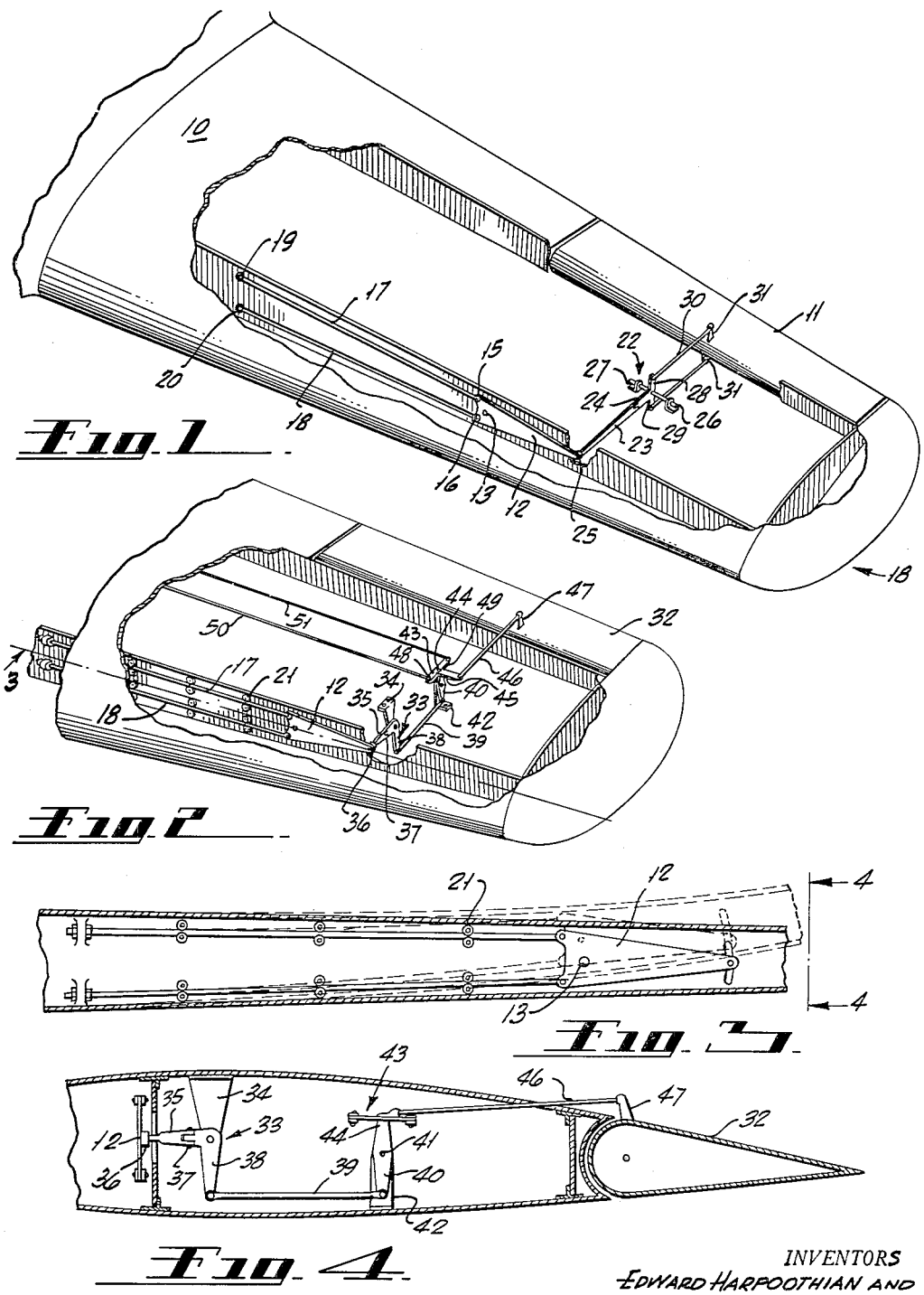

INVENTORS
EDWARD HARPOOTHIAN AND
WILLIAM BAILEY OSWALD
BY J Edwin Coates
ATTORNEY

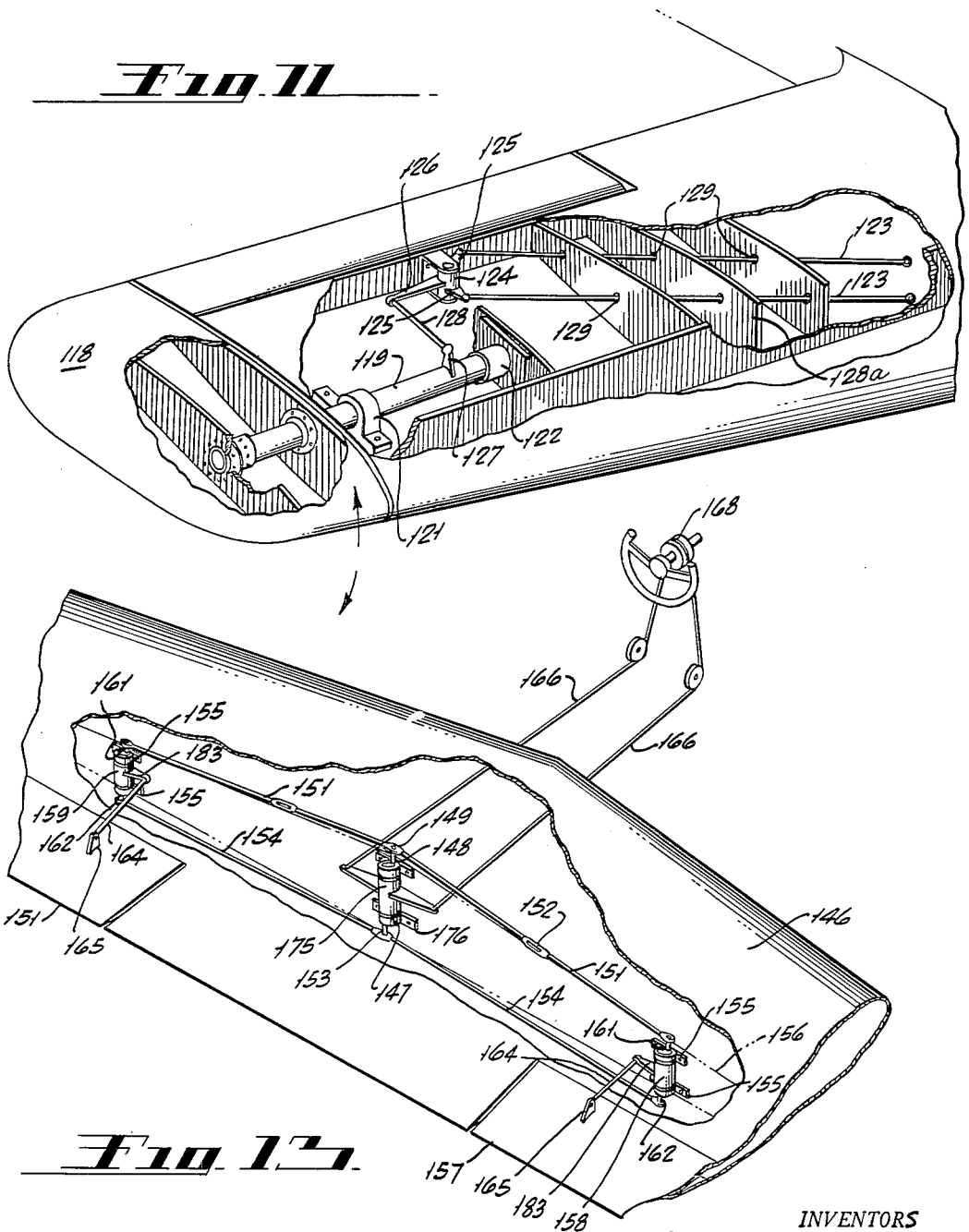

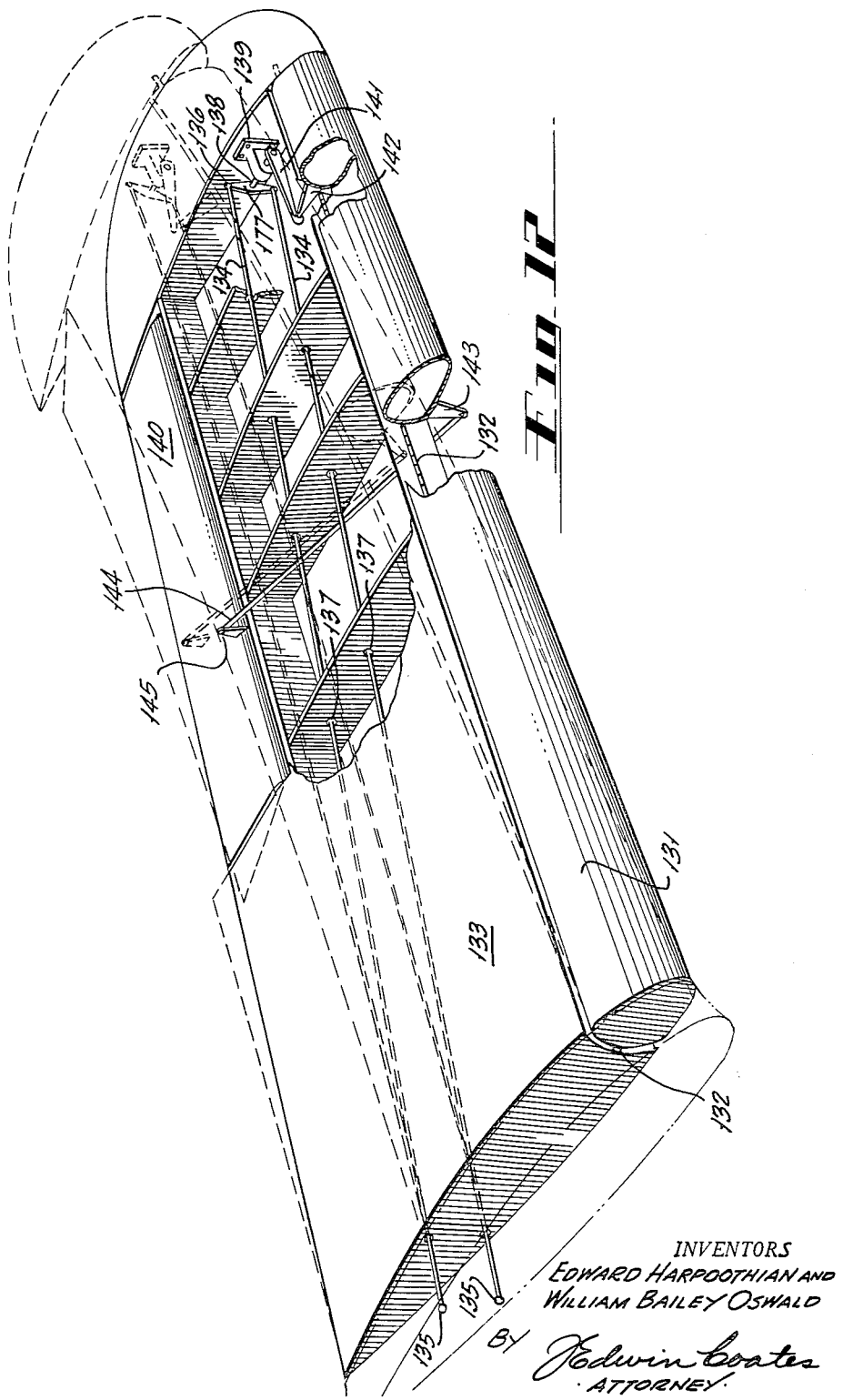

United States Patent Office 2,745,613
Patented May 15, 1956

2,745,613

GUST LOAD ALLEVIATING DEVICE

Edward Harpoothian and William Bailey Oswald, Los Angeles, Calif., assignors to Douglas Aircraft Company, Inc., Santa Monica, Calif.

Application December 10, 1951, Serial No. 260,821

19 Claims. (Cl. 244—76)

This invention relates to aircraft having sustaining surfaces that are subjected to gust-loading and aims to relieve these gust-deflected surfaces automatically from such extra loading in order to produce smoother flight and to prolong the life of the surface and enhance the safety of the airplane.

This application is a continuation-in-part of our application, Serial No. 78,866, filed February 28, 1949, entitled "Gust Load Alleviating Devices," and now abandoned.

The wings and other airfoils of modern airplanes are repeatedly subjected to upward and downward deflections under the action of gusts or thermal currents when the airplane passes through certain localities. Such flexures of the airfoil not only render the flight uncomfortable but stress the airfoil framing inordinately, thereby decreasing the margin of safety of the airfoil and weakening its fibre structure through fatigue.

Although it has been proposed hitherto to relieve gust-loaded airfoils of this extra loading by employment of torsionally flexible wings, wings rotatable at their roots, electronic gust anticipators and other devices of this general nature, all these prior proposals are subject to frequent failure for various reasons. Moreover, even the mechanical or linkage type gust load alleviators hitherto proposed have been found unsatisfactory because of their being constructed with heavy, multiple lever deflection transmitting and multiplying systems which are quite prone to structural failure, or because they include hydraulic struts or incorporate power multiplying systems, all of which previous devices impose a prohibitive weight penalty. For these and other reasons actual use of these ideas is precluded. In each case, they also involve in their operation a time lag factor of such duration that the "bump" has been passed before the device can function; or they require such a long time to operate that the airfoil's structural fibres will be excessively strained and remain in a greatly deflected condition too long before the device restores the airfoil to its original condition. In hydraulically operated devices, the foregoing situation is aggravated by the fact that the lag of such systems is augmented by the lag of the mechanical linkage and other parts comprising the system.

The present invention reduces the upward and downward flexures of airfoils about a chordwise axis and torsional deflection thereof about a spanwise axis, under the action of gust-loads, by providing means directly and linearly responsive to the gust-originated deflection and operatively associated with wing-lift varying means for suitably varying the effective camber of the wing in that direction which provides an aerodynamic reaction directed in that sense which restores the airfoil to its normal spanwise and chordwise attitude. For example, these means are effective, when a wing is flexed upwardly, to reduce the lift on the wing, thus allowing it to "sink" to its original trim with relation to the fuselage. When the wing is gust-deflected downwardly, the present means are effective to increase the lift and raise the wing back to its original trim with respect to the fuselage.

The invention also provides means which can be employed either in conjunction with the aforestated means or independently thereof, to overcome twists of the wing about a spanwise axis due to gust-loads, the latter-said means, in one-form, consisting of airfoils mounted along the leading and trailing edges of the airfoil and effective to apply to the airfoil a force couple acting about the spanwise axis of the airfoil in a direction such as to restore the airfoil to its normal angle of incidence.

In either of the aforestated cases, the device acts substantially instantaneously, without the time-lag heretofore inherent in such devices. It acts directly proportionately to the gust-loading and the deflection caused thereby.

With these and other ends in view the device essentially includes airfoil deflection sensing-means carried wholly or partially by the airfoil and extending spanwise, or mainly spanwise thereof. The one end-region of the sensing means is immobilized with respect to the wing bracing structure or with respect to the wing as a whole, as the case may be, the opposite end of the sensing means being entirely free of the wing and bracing structure. This end is operatively connected to lift-varying means carried by the wing so that the movements of the free-end relatively to the bracing structure operate the lift-varying means in the aforedescribed manner.

The free-end of the sensing means is, in most embodiments, directly and immediately and single-line connected to the lift-varying means by the shortest possible route, namely, the straight line extending between the said free-end and the horn of the lift-varying means. This connection consists usually of simple, end-to-end links, this rigid, direct-acting, force-transmitting means obviating the prior indirect, time-lagging transmissions heretofore consequent upon the employment therein of force-multiplying lever systems; and transmissions incorporating servomotors such as hydraulic boosters.

The movements of the free-end hence being transmitted to the lift-varying means substantially immediately, with a time-lag differing in appreciably from zero, the device completes its alleviating action and restores the airplane to its original attitude, before the "bump" has really made its presence felt. The flight-path of the airplane is hence smoothed to a noticeable extent.

The movements of the free end of the sensing means constitute the sole motive force for correctively actuating the lift-varying means, and, in combination with the novel transmission means connecting the free-end and the lift-varying means in the novel manner decsribed hereinabove, the fact that the sensing-means also constitutes the sole motive power for actuating the corrective means entirely obviates the prevalent use between the free-end and the lift-varying means of force-multiplying means such as hydromotors. By eliminating hydromotors and their time-lag and unreliability, in combination with the other features hereinabove set forth, the invention provides a practicable and adaptable gust-load alleviator.

Although these features are usually sufficient to adapt the device to employment in any type of airplane in which the wing is of conventional flexibility, to meet the case where the airplane is of a type having unusually rigid wings which therefore reach their point of maximum deflection very quickly, the invention contemplates endowing the functionally unitary sensing-means, lift-varying means and force-transmitting means, as a unit, with a mass-weight and flexibility that are selectively less than the corresponding mass-weight and flexibility of the unitary wing and its bracing structure by an amount sufficient to endow the first-mentioned combination with a natural vibration frequency considerably higher than that of the wing and bracing structure. This higher vibration frequency enables the gust-alleviating system in the comparatively rigid wing to complete its wing-load relieving action well before the wing reaches its maximum deflection under the gust-load, so that the alleviator substantially completely obviates "bumps."

The invention also contemplates that this feature of mass-weight ratios may be employed in wings of ordinary flexibility since it not only results in eliminating "bumps," but reduces the amount of flexures of the wing framing elements and therefore minimizes fatigue and crystallization of the metal of these elements.

Several forms selected from among the presently contemplated embodiments of these and others of the inventive concepts are illustrated in the accompanying drawings and described hereinafter in conjunction therewith. It is to be understood, however, that these forms are presented merely to further clarify the invention and to enable the construction of at least one actual embodiment thereof. The presentation therefore in no wise limits the scope of the patent, which scope is to be determined solely by the ambit of the subjoined claims.

In these drawings:

Figure 1 is a perspective view of a wing partly broken away and including that form of the invention referred to as the "triangular-pick up plate" and "bell-crank motion transmitter" type;

Figures 2, 3, 4, and 5 are views of a so-called "pilot-overridable" form of the invention, Figure 2 being a perspective view of a broken-away wing that includes the present alleviator, Figure 3 being a spanwise section on line 3—3 of Figure 2; Figure 4 being a view on line 4—4 of Figure 3, and Figure 5 being a top plan view, partly broken away, of the wing and alleviator of Figure 2;

Figure 11 is a fragmentary perspective view of a swept-back wing that includes a form of the deflections-sensing and transmitting means adapted to respond both to wing-tensions about the wing's neutral axis and to flexures about a chordwise flexure-axis of the wing and transmitting them to a corrective airfoil in the form of a floating wing-tip;

Figure 5:
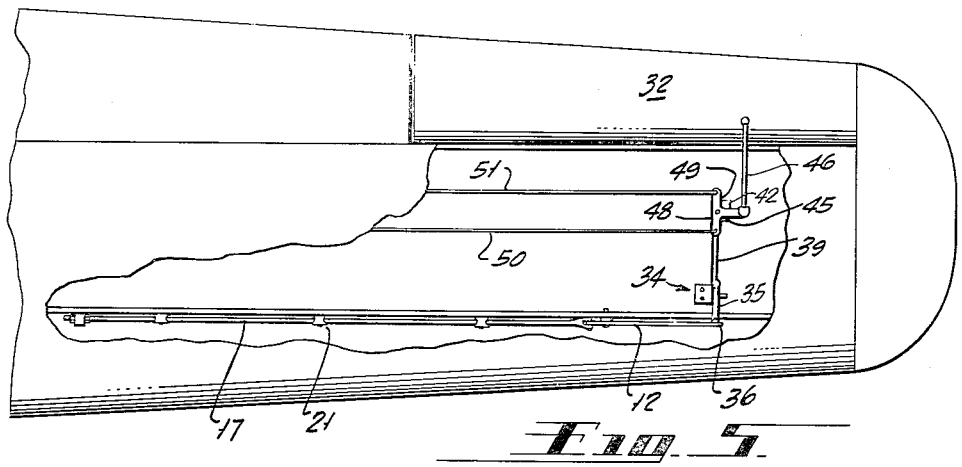

Figure 12 is a perspective view of a wing broken away to show another form of deflections-sensing device responsive to similar torsions and flexures and transmitting them to movable leading edge airfoils and trailing edge airfoils particularly adapted to alleviate torsions by setting up restoring couples about the wing's neutral axis; and Figure 13 is a perspective view, partly broken away, of the central portion of a wing incorporating still another form of deflections-sensing and transmitting means tied-in with variant means for enabling the pilot to override or augment the alleviator action on a laterally spaced pair of trailing edge airfoils.

The gust responsive member and the mechanical linkage system interconnecting this member with the camber varying member as of the showing in Figure 1 picks up both the flexural distortion or bodily displacement of the wing 10 and the fibre stress of the wing-skin and framing members supporting the gust responsive member and transmits the resulting forces in summation to an auxiliary, flexure-corrective airfoil 11 pivotally mounted to the wing at the trailing edge thereof, the conventional or normal control surfaces thereof not being shown. To this and other ends, in this embodiment the gust responsive unit includes a relatively rigid, elongate plate 12 pivotally mounted at a point 13 on the foremost spar of the wing in facewise parallelism therewith. For the purposes of this particular configuration of the inventive concepts, the plate preferably has a triangular shape with its base inboard and its apex outboard. The upper and lower corners 15 and 16 of the base are attached, as by means of pre-tensed cables or links 17 and 18, to fixed points 19 and 20 located on the spar a predetermined distance from the corners of the triangular member and constituted in one suitable form by bolts or rivets or other fixed fasteners.

With this construction and arrangement of parts, when the wing deflects upwardly, the lower margin of the spar is elongated and the upper margin of the spar is compressed and shortened. The links 17 and 18 retain their original length which is thus effectively changed with respect to the lengths of the upper and lower margins of the corresponding portions of the spar, with the result that link 18 pulls point 16 inwardly and link 17 urges point 15 outwardly. Consequently the outer free end of plate 12 moves relatively downwardly with respect to the spar and in direct proportion to the flexure of the wing and to the fibre stresses of the skin and spar, which summate to deflect 12 more than the deflection thereof that would be caused by the mere relative displacement of the wing and 12 due to the mere upward displacement of the wing. The means for translating this differential longitudinal movement of the link-end relative to each other and to spar into a chordwise movement and applying it to the auxiliary airfoil in the proper bidirectional manner, illustratively comprise rigid, articulated chordwise-extending linkage members constituting a direct connected, direct acting, non-lagging, substantially instantaneously operating force-translating, transmitting and transforming system. The members of this system include a tri-arm bell crank 22 having its mid-arm 23 elongated forwardly and divided lengthwise into two portions united by a pivot joint 24 having a vertical axis. The forward end of arm 23 is joined to the apex of plate 12 by a ball and socket joint 25 not shown in detail. These two joints, 24 and 25, cooperate to accommodate the differential movement between the triangular member in the vertical spanwise plane and the movement of the mid-arm in the vertical chordwise plane at right angles thereto. This differential is absorbed without jamming or binding and is transmitted to the other two arms of the bell crank. The medial portion of the crank 22 is fixedly borne on a shaft 26 journaled in suitable bearings 27 mounted in the wing interior. From the extremity of each of the vertically extending arms 28 and 29 of the crank, rigid links 30, articulated thereto, pass rearwardly to the respective control horns 31 of the auxiliary surface 11 to which their rearward extremities are articulated. It is to be understood that the construction just described is merely representational as to details, the design of the parts and their organization together being subject to many variations within the scope of the general configuration outlined.

Upon upward deflection or flexure of the wing under the action of an upgust or thermal current, the apex of the plate 12 moves relatively downwardly and consequently deflects the arm 23 downwardly, rotating the upper arm 28 forwardly and the other arm 29 rearwardly, thus deflecting the auxiliary surface 11 upwardly and decreasing the effective camber and lift of the wing in an amount directly proportional to the amount of gust flexure thereof to restore the wing to its original position and condition, substantially relieved of the gust load. When the direction of the gust is reversed, the device functions in the reverse manner to effect downward deflection of the auxiliary surface 11, thus increasing the lift in proportion to the negative gust loading and relieving same of the gust loading.

The total mass-weight of the combined sensing means, lift-varying means and force-transmitting means is predeterminedly less than that of the combined wing and bracing structure by an amount, varying with the type and size of airplane and the flexibility of the wing in which they are employed, adequate to confer upon the first-mentioned combination a natural vibration frequency substantially higher than the natural vibration frequency of the wing and bracing structure. This differential enables the first-mentioned combination to complete its wing-load relieving action well before the wing reaches its maximum flexure under the gust-load. The action-lag of the device is therefore substantially zero.

In furtherance of this objective, the initial tension of the alleviator and the linkage system connecting same to the lift-varying means are properly correlated with the aforestated differential. Inasmuch as the pre-tensed sensing rods and plate 12 can be elongated to confer any desired response-sensitivity upon the system, any time-lag might be introduced through friction, lost-motion, etc., can be totally eliminated to cause the device to operate almost instantaneously. Hence, "bumps" are reduced to the minimum, since the wing is restored to its original attitude almost as soon as the "bump" is encountered. The vertical-trace of the flight-path is thus considerably smoothed while the fatigue factor of the airfoil is so reduced as to prevent "crystallization" of the wing framing members under the repeated extreme flexures and twists which an unalleviated wing undergoes.

In maneuvers or steeply banked turns, it would be undesirable to have the alleviator operate upon the lift-varying means and therefore in such airplanes as perform these maneuvers, the invention contemplates the provision of conventional "lock-out" means, not shown but combined with the linkage system in the usual manner to operate to lock the latter in such a way as to prevent its operating the lift-varying means.

The alleviator-species illustrated in Figures 2, 3, 4 and 5 employs for its camber-varying means the same airfoil, 32, that is utilized either as a roll control surface or as a lift intensifying surface, here shown as an aileron. The linkage is configured to tie-in with certain components of the pilot's surface-operating mechanism, so that either system can act independently of the other; or in summation. The alleviator acts to reduce or eliminate the gust load from the wing by operating the surface 32 without reacting upon the pilot's control column, which is left immobile. That is to say, the alleviator linkage mechanism utilizes part of the aileron-operating controls structure without operating the control cables leading back to the control column, and vice versa.

It also incorporates the same configuration of gust responsive members 12, 17, and 18 as that which was described in conjunction with Figure 1. A series of anti-friction rollers or guides 21 is provided on the spar adjacent to each side of each of the links 17 and 18 in each embodiment of the invention, to constrain these links to conform to the curvature of the spar when it flexes upwardly or downwardly. The connection between the member 12 and its motion transmitting linkage and the motion transmitting linkages themselves, in this case, are, however, such as are necessary constructionally to work through the intermediacy of a portion of the control surface operating controls already present in the wing and with the minimum lag and directly proportional to the flexure of the wing, operating the control surface 32 oppositely to the direction of deflection of the wing.

To these and other ends, the motion transmitting mechanism referred to comprises a bell crank 33 suspended at its elbow from the wing structure for example, by means of a bracket 34. The forward terminal of the horizontal arm 35 of the crank 33 is pivotally connected by means of a ball and socket or similar joint 36 to the outboard extremity or apex of the gust responsive member 12 and accommodates the spanwise differential in the arcuate movement of the apex of the gust responsive member to the vertical chordwise movement of the connected terminal of the bell crank. In order to accommodate the vertical differential in the arcuate movement of the plate 12 and the bell crank 33 to the rest of the linkage system, hinged joint 37 is provided in the upper arm of the bell crank to enable spanwise pivoting of the forward portion of the upper arm. The terminal of the lower arm 38 of the bell crank is pivotally connected to the front end of a link 39, the rearward end of which is pivotally connected to the lower terminal of an arm 40 carried pivotally at a point 41 on a bracket 42 mounted on the lower inside surface of the wing. On the upper end of this arm 40 a triple-arm bell crank 43 is floatingly mounted as by a ball and socket joint, or a universal joint, 44. The spanwise or medial arm 45 is connected by means of a link 46 to a horn 47 on the airfoil 32, the two terminals of this link being connected to the adjacent members by means of ball and socket joints, as indicated. The chordwise extending arms 48 and 49 of the bell crank referred to are connected by means of control cables 50 and 51 to the pilot's control column. Thus the triple arm bell crank is floatingly mounted for rotation both about its spanwise axis, that is, bodily twisting forwardly and backwardly in a vertical plane by link 39 and for rotation about its vertical axis, in a horizontal plane, by 50 and 51, to enable operation of the aileron from the control column.

When the wing is flexed upwardly by the action of an up-gust, the plate 12 moves relatively downwardly and thereby rotates the foremost bell crank 33 counter-clockwise, urging the link 39 rearwardly and rotating the arm 40 counterclockwise or forwardly at its upper end, thereby forwardly bodily rotating the triple-arm bell crank in the vertical plane about its spanwise axis without rotation about its vertical axis, thereby to pull the link 46 forwardly and elevate the control surface 32. As a consequence, the wing is deflected downwardly in proportion to the gust loading since the airfoil 32 has been raised in proportion to the upward deflection of the wing, so that the wing is substantially relieved of its gust loading to the extent that it was loaded. When the wing is flexed in the opposite direction, the alleviator functions in the reverse manner to increase the camber and lift and bring the wing to its original position, thereby again relieving it of its gust load. Whether or not the alleviator is operating, the pilot still has full control of the aileron and his control actions are superimposed on those of the alleviator if the latter is acting.

Figure 6:
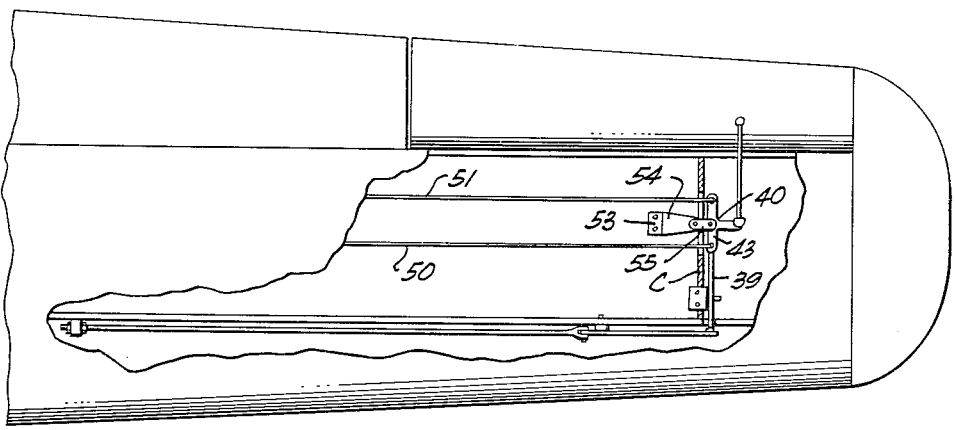
Figure 6 is a top plan view of a wing, partly broken away, that includes an alleviator and pilot-operable overriding system added to a wing where there is a structural obstruction to the congruent location thereat of any type of chordwise-extending force-transmitting means.

In Figure 6 also, the alleviator functions through a part of the control-surface operating controls and is adapted to be applied to the internal framing of the wing of a certain widely used twin engine transport, the triple-arm bell crank 43 being supported at a point offset considerably inboardly from the point of support shown in Figure 2 and in a manner such as to clear the operating mechanism including the crank 43 and its supporting arm from certain chordwise extending structural members C peculiar to the wing-framing of this well known type of transport. In order to achieve this end, a bracket 53 is mounted inside the wing and includes a horizontal arm 54 that supports a link 55 pivoted at its inner end to the outer end of the horizontal arm. The outer end of this link pivotally supports the triple-arm crank 43 in a manner identical to that of the same crank of the immediately preceding figures. The remainder of the wing flexure motion transmitting means including the support lever 40, and the control surface actuating mechanism, is substantially identical with that described in conjunction with the previous figures. Thus, the triple-arm crank 43 can rotate in the horizontal plane, under the action of the controls 50 and 51 without reaction on the alleviator sensing mechanism and can be revolved about its longitudinal axis by link 39 to actuate 32 without actuating 50 or 51. In all other essential respects, the alleviator of Figure 6 is substantially the same in its construction and rule of action as that of Figures 2–5, inclusive.

Figure 7:
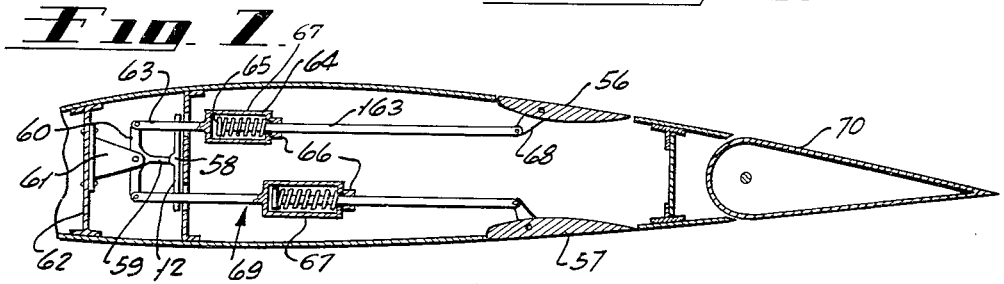
Figure 7 is a chordwise sectional view of a wing containing another form of lift-varying means adapted to be operated by the alleviator.

Alleviation of gust loading is achieved in the species of Figure 7 by a spoiler system 56, 57 and intervening parts, which system obviates the necessity for an auxiliary airfoil like that of Figure 1 and eliminates the motion transmitting and transforming linkage and leverage system shown in Figures 2 to 6 for connecting the gust responsive member to a trailing edge airfoil. In effectuating this result, the gust responsive plate 12 and its mounting included in the preceding species is employed on the front spar of the wing, but is ball-jointed, as at joint 58, to the mid-arm 59 of a crank 60 pivotally mounted in its middle portion to a rearwardly extending bracket 61 mounted on a spar-like member 62 carried by the nose structure of the airfoil. The upper end of the aforesaid lever 60 pivotally bears a horizontally rearwardly extending link 63 passing through a suitable aperture in the front spar of the wing. Rigidly fixed to the rear end of link 63 is a spring box 64, closed at its forward end, and centrally open at its rear end. The link 163 fixedly bears a collar 65 pinned thereto adjacent the front end of the box, and another collar 66 pinned thereto outside the box and adjacent the rear face thereof. A helical spring 67 is mounted on the link between the collar 65 and the inner rear face of the box. The rearmost end of the link 163 is pivotally connected to the lower end of a horn 68 attached to the lower surface of the spoiler 56, which is pivotally set into the upper surface of the wing substantially at its one-third chord point. When link 63 moves rearwardly, collars 65 and 66 are engaged by the inner and outer surfaces of the box 64 and link 163 is moved rearwardly to raise spoiler 56. Forward movement of link 63 cannot force the spoiler inwardly and such movement merely compresses spring 67 instead.

The lower end of lever 60 is pivotally connected to the forward end of a spring loaded linkage system 69 similar to that just described. The rear end of the linkage system 69 is pivotally connected to the spoiler 57, which is pivotally set into the lower surface of the rear portion of the wing body. The trailing edge of the wing carries an aileron or conventional flap 70 operated and functioning in the usual manner and acting independently of the alleviator system.

When the wing is flexed upwardly by an up-gust, the apex of the gust responsive plate 12 moves relatively downwardly, thereby, through the aforedescribed linkage and leverage, effectuating elevation of the spoiler 56 sufficiently to destroy the laminarity and Bernoulli effect of the airflow over the upper surface of the wing rearwardly thereof and over the chordwise subtended portion of the upper surface of the wing, with corresponding loss of lift by the wing, the spoiler 57 remaining nested within the wing-profile. Consequently, the wing returns to its original position, whereby the flight path is smoothed and the wing fibres are relieved of the guest loading stress. When the wing is downwardly flexed, as by a down-gust, alleviation of the gust-loading takes effect in the reverse direction, the alleviator operating in the reverse manner to that just described and downwardly deflecting the spoiler 57 to create turbulence on the lower surface of the wing and to minimize downwardly acting unbalanced aerodynamic forces thereon without, of course, moving the spoiler 56 or the trailing edge flap 70 at all. As a consequence, the negatively loaded downwardly flexed wing returns to its original position thereby relieving it and the aircraft of the effects of the down-gust.

Figure 8:
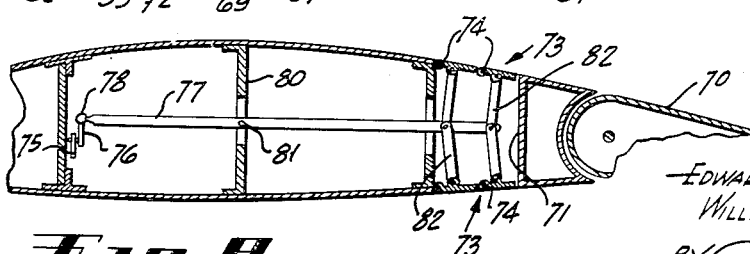
Figure 8 is a chordwise sectional view of a wing that includes still another form of the alleviator-operated lift-varying means.

The inventive principle is incorporated in Figure 8 by means including an openable and closable slot 71 connected to the gust-load movable element 12 and replacing the auxiliary airfoil of the previously described species and functioning to alter the lift of the wing without altering its effective camber. In this species, the wing carries a conventional flap or aileron 70 operable independently of the alleviator means of this invention. The slot 71 is preferably disposed rearwardly adjacent the medial portion of the wing or substantially at the 50% chord point thereof. The upper and lower terminals of the slot are each closed by a pair of gates 73 hinged at their forward edges on pivot pins 74, both pairs of gates being adapted for upward and downward rotation, pins 74 extending spanwise of the slot and being supported at their lateral extremities in the opposed, spanwisely opposite ends of the slot. When the wing is subjected to a down-gust, flexing same downwardly, member 12 rotates relatively upwardly and the downwardly acting unbalanced forces acting on the lower surfaces of the wing are decreased by the downward airflow created by the gates opening, top and bottom, and directing air downwardly through the slot onto the lower surface. The turbulence created thereon incident to mixture of the gust and airstream decreases the "down-lift" on the wing, thereby allowing the wing to return to its original position and relieving it of gust loading effects. When the wing is subjected to an up-gust, the lift on its upper surface is decreased by the reverse operation of the slot and the mechanism previously described. This mechanism opens the gates and allows the air in this instance to flow upwardly into the upper surface boundary layer, admix therewith, and increase its turbulence, thereby destroying the laminar flow over the portion of the upper surface of the wing that is subtended rearwardly of the spanwise slot, minimizing the lift and allowing the wing to sink to its original position. To accomplish control of the slot gates, the mechanism mentioned comprises a gust-load responsive plate member similar to those previously described herein, the apex of which member is shown at 75. To the apex is pivotally attached an arm 76 depending from a horizontally extending shaft 77. The upper end of the arm 76 is connected to the shaft 77 by a ball and socket joint 78. The shaft 77 passes horizontally through a stringer 80 of the wing and is pivoted to the stringer for movement in the vertical plane around a horizontal pivot pin 81. Aft of the stringer 80, shaft 77 pivotally bears two pairs of toggle links 82, the outer end of each link being pivotally connected to ears on the inside of each gate 73, the connection being established rearwardly of their hinge axes. When the apex 75 of the gust responsive member moves relatively downwardly, on the occurrence of an up-gust and consequent upward flexure of the wing, shaft 77 revolves counterclockwise about its pivot axis, rotating the upper pair of gates outwardly and the lower pair inwardly, thus opening the slot 71 to the passage of air therethrough to the upper surface of the wing. On the occurrence of a down-gust, the apex of the gust responsive plate moves relatively upwardly, revolving the shaft 77 clockwise, opening the upper gates inwardly and the lower gates outwardly and allowing air to pass downwardly through the slot. In either sense of action of the alleviator, therefore, the wing is relieved of its gust loading effects and is restored substantially to its original position and unstressed condition.

Figures 9, 10:
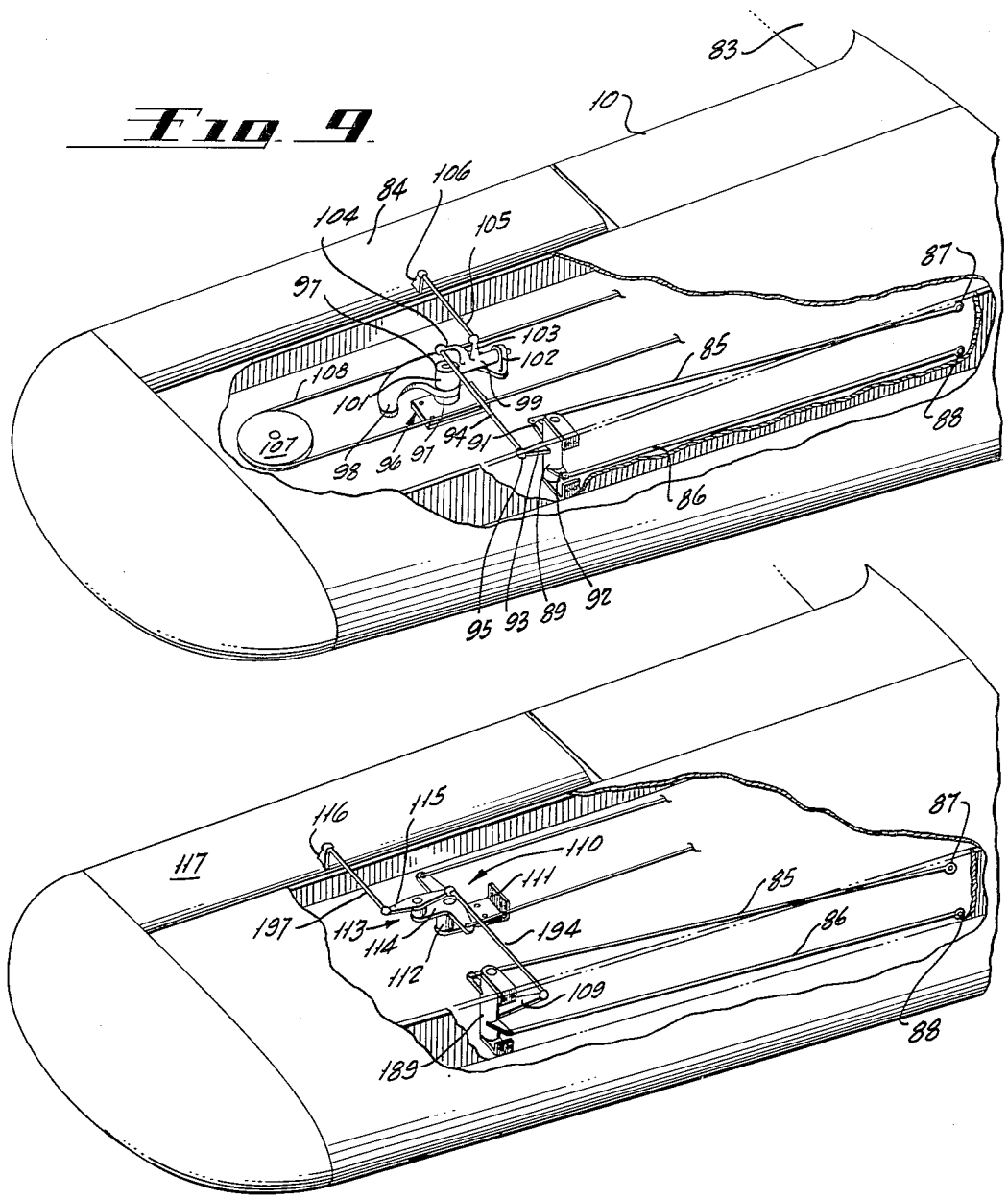
Figure 9 is a perspective view of a wing, partly broken away, and showing the alleviator's deflection-sensing and transmitting means combined with another form of pilot-operable control surface actuating means.
Figure 10 is a perspective view of a wing, partly broken away and showing the alleviator's sensing and transmitting means combined with another form of "tie-in" means for enabling the pilot to override or augment the alleviator action.

The differential actions of the free-ends of the sensing rods relative to each other and to the spar under gust-loads on the wing are, in the embodiment shown in Figure 9, picked-up and transmitted to the corrective airfoil through means tied-in with interposed pilot-operable controls for this airfoil, and in a manner considerably different from that of Figures 2–6, inclusive.

In Figure 9, the construction comprises a wing 10, a fuselage 83, an aileron 84, and dual means interposed, in the wing, between the fuselage and the aileron for operating the latter either by gust-responsive sensing means, by the pilot's aileron controls or concurrently by both these last two mentioned means.

The sensing means include a pair of elongate, substantially inextensible, substantially coextensive rods 85 and 86 arranged in vertical separation in the wing adjacent the forward spar thereof. The inner ends of the rods are anchored to the fuselage or other fixed structure at points 87 and 88 and their outboard ends lie adjacent a vertically disposed torque tube 89 mounted to the front spar for rotation about its vertical axis. From the rear end front faces of the tube project arms 91 and 92, which are pivotally connected to rods 85 and 86, respectively. From a spanwise extending actuator arm 93 on the torque tube, a link 94 extends chordwise rearwardly. Link 94 is connected with arm 93 by a ball-and-socket joint 95.

At the rear end of link 94 is disposed a mechanical movement 96 for enabling the pilot to operate the aileron 84 through a force-transmitting portion of the alleviator system. The group 96 comprises a vertically extending post 97 mounted to the wing; a bi-arm crank, or sector 98 mounted in horizontal attitude for rotation about the post as an axis. Above the crank is a radially extending, horizontally disposed torque tube 99, the inner end of which is pivotally mounted to the post 97, on center with the crank, by means of an end bearing, not shown, in a boss or hub 101. The outer end of torque tube 99 is pivotally mounted in an upright ear 102 for enabling rotation of the torque tube around its own longitudinal axis. The tube 99 also undergoes bodily revolution with the crank as the latter rotates in a horizontal plane, as hereinafter described.

Projecting upwardly from the upper curve of the torque tube 99 is a rigid arm 103. Another rigid arm 104 projects longitudinally upwardly and inwardly from the inner end of the torque tube to a point on the extended axis of post 97. A link 105 extends connectedly between arm 103 and a horn 106 on the aileron, the connections being made by ball-and-socket joints. The arm 104 is connected to the rear end of link 94 by a similar ball-and-socket joint.

A pulley, or other direction-changing means 107, is mounted in horizontal attitude in the wing, and a pilot's control cable system 108 is looped therearound. An intermediate portion of the cable "takes" on the periphery of the crank for imparting oscillatory motion thereto.

Upon occurrence of an up-gust acting on the wing, the latter flexes upwardly, in effect elongating rod 85 relatively to the upwardly flexed spar and relatively contracting rod 86. This differential action effects rotation of the vertical torque tube 89 in a counter-clockwise direction, viewed in plan, such rotation swinging actuator arm 93 forwardly, tensioning link 94, rotating torque tube 99 forwardly about its axis, tensioning link 105 and upwardly deflecting aileron 84. Such deflection decreases the effective angle of attack of the wing and the resultant loss of lift restores the wing to its original trim.

Downward deflection of the wing effects reverse movements in the alleviator system resulting in downward deflection of the aileron, with a consequent raising of the wing to its original attitude.

Upon operation of the pilot's controls in either direction, the cable system 108 effects a corresponding oscillation of the crank 98. But, since the rear end of link 94 lies on center with the crank and since radial torque tube 99 is not rotated by the sector rotation, its inner end merely rotating on center with the crank, link 94 is neither tensioned nor compressed and the alleviator pick-up system is hence isolated from the pilot's actions. However, rotation of the crank in either direction exerts either a tension or a compression on link 105 therefore either elevating or depressing the aileron and effectuating part of the lateral control of the airplane.

The arrangement shown in Figure 10 performs similar functions in substantially the same manner by a construction comprising a pair of sensing rods 85 and 86 similar to those shown in Figure 9 and connected to a vertically disposed torque tube 189 similar to the previous one and similarly mounted but with an actuator arm 109 extending inboardwardly from its inner face, a link 194 being pivotally connected at its forward end to the actuator and extending chordwise rearwardly in the wing. At the rear end of this link is disposed a group 110 tied-in with pilot-operable controls and with the alleviator action system as, and for the purposes, hereinbefore described.

This group 110 comprises a bracket 111 fixed to the wing and including a post 112 to the upper end of which is pivoted a horizontally disposed tri-arm bell crank 113. The medial arm 114 of the crank bears at its outer end a spanwise extending lever arm 115 pivoted at its medial portion to said end. The inner end of lever 115 lies on center with the center of the tri-arm crank 113 and the outer end of lever arm 115 lies in chordwise alignment with the horn 116 of an aileron 117. The inner end of lever 115 is pivotally connected to the rear end of the link 194 by a ball-and-socket joint and the outer end of lever 115 is operatively connected to the horn 116 means of a link 197 having ball-and-socket joints at each end thereof.

Responses in opposite senses of the sensing-means to oppositely directed gust-loads are transmitted to the aileron from the vertical torque tube through link 194, lever 115 and link 197, respectively directed responses deflecting the aileron in respectively opposite directions which effectuate relief of the wing's deflections.

Since lever 115 is pivotally mounted on the bell-crank, its movements have no effect on the bell crank and hence are not transmitted to the pilot's control column. Since the rear end of link 194 is universally connected to the inner end of lever 115 and since this connection lies on center with the tri-arm crank, rotation of the bell crank by the pilot has no effect on link 194 or on the alleviator sensing-means and transmitting means.

In Figure 11 there is shown a form of gust-load alleviator which concurrently corrects gust-caused deflections of a rather easily torsioned sweptback wing about both a spanwise axis and about a chordwise axis. The construction comprises, essentially, a "floating" wing-tip section 118 mounted to the body of the wing for rotation about a spanwise axis by means of a rigid, rotation supporting tube 119 which extends along a spanwise line of the wing-tip and the wing main body between the tip and the body and fixed at its outboard end to the wing tip. Bearings 121 and 122 are provided in the wing main body to provide for the necessary rotation of tube 119. A pair of vertically spaced, elongate, substantially inextensible detector rods 123 is provided and disposed diagonally in the wing. The inboard end of each rod 123 is rigidly fixed to the fuselage or adjacent fixed structure, whereas the outer end of each rod is free. These outer ends are interconnected by a vertically disposed torque-tube 124 mounted on the rear spar for rotation about its vertical axis. The free ends of the rods are connected to substantially oppositely disposed, vertically spaced arms 125 on the periphery of the torque tube so that the relative, longitudinal movements of the rods will rotate the torque tube, which tube also bears a horizontally extending actuator arm 126.

The tube 119 bears an arm 127 extending upwardly therefrom and a link 128 is pivotally connected at its ends to arms 126 and 127.

Rods 123 pass through wing ribs 128a by means of grommeted apertures 129 which the rods normally clear radially but against which the rods bear when the wing undergoes chordwise torsion. The rods are thus made to respond concurrently or on separate occasions to wing torsion and wing flexure.

When the wing flexes and/or twists so that its tip and its leading edge lie above their normal positions, upper sensing rod 123 in effect undergoes extension relative to the span while the lower end relatively contracts. The torque tube to which they are connected therefore undergoes counterclockwise rotation, viewed in plan, thus urging actuator arm 126 forwardly. By means of link 128 this action rotates tube 119 forwardly or from rear to front, thereby depressing the front edge of the floating wing tip. This decrease in the angle of attack of the tip locally decreases the wing lift sufficiently to lower the wing about its chordwise and spanwise axes and return it to its original attitude.

Upon occurrence of a down gust, the reverse actions take place.

In Figure 12 is shown a variant form of gust-load alleviator adapted to concurrently correct both flexures and twists of a wing by deflections-detector means, and a pair of airfoil means acting in unison and with the detector means to both decrease or increase, as needed, the overall effective camber and angle of attack of the wing and to create oppositely acting couple-forces at the leading edge and trailing edge of the wing that overcome the wing's twist.

To these ends, as shown in detail in Figure 12, a separate leading edge section 131 is hingedly connected, as by means of a piano-type hinge 132, along its entire rear edge, to the main body of the wing 133, thereby to enable upward and downward deflections of the airfoil 131. The innermost end of airfoil 131 is rigidly fixed to the fuselage, as indicated, and member 131 is of sufficient flexibility to congruently follow the upward and downward flexures of the wing under gust-loads.

At the trailing edge of the wing an airfoil 140 is deflectably mounted, in the usual manner, for depression and elevation. Vertically spaced, substantially inextensible sensing elements 134 are disposed in the wing and extend diagonally thereof from anchorage points 135 on the fuselage near the trailing edge to a region lying near the wing tip and near the entering edge of the wing. The outboard ends 136 of elements 134 are free to move mutually differentially and relatively to the wing framing on flexure and twist of the wing. The elements 134 pass through grommeted apertures 137 in the wing ribs shown. These deflections-detector elements are hence adapted to respond to both wing-flexures and wing twists. The free ends 136 are pivotally connected to a double-armed lever 177 extending substantially vertically between these ends. The medial portion of arm 177 rigidly bears a substantially chordwise extending shaft 138, which is rotatably mounted in a bracket 139 fixed to structure inside the wing, as shown. An arm 141 is rigidly fixed to the forward end of shaft 138 and extends spanwise in the inboard direction. The inboard end of arm 141 is pivotally connected to an arm 142 extending chordwise rearwardly from an outboard portion of the leading edge section 131. From a horn 143 on the lower surface of the leading edge section 131, an actuating link 144 extends to the usual operating horn 145 on the upper surface of the airfoil 140.

On upward twist of the forward portion of the wing and downward twist of the rearward portion thereof relatively to the horizontal plane and concurrent bodily upward flexure of the outboard portion of the wing about a chordwise axis, the parts assume the relative positions shown in dotted lines. The relatively downwardly twisted outboard portion of the leading edge section 131 assumes a decreased angle of incidence and a decreased airload, with a consequent loss of lift, whereas the lowered rear airfoil 140 assumes an increased angle of incidence and an increased airload, with a consequent augmentation of lift. The resultant clockwise directed couple, viewing these forces from the inboard end of the wing, is therefore so applied to the wing as to alleviate the wing's counter-clockwise, or upward, twist, and restore the wing to its chordwise trim.

Concurrently, since the effective area of the leading edge section 131 is considerably greater than that of the aircraft 140, the net negative differential between the relatively great "negative-lift" generated by the leading edge section and the lesser position lift generated by the rear airfoil 140, in effect decreases the effective camber of the upwardly flexed portion of the wing. The consequent loss of lift in this portion of the wing restores it to its original trim in the spanwise direction.

On downward flexure of the wing with concurrent twist of the wing about its neutral axis with the leading edge portion of the main body 133 deflecting downwardly from the horizontal plane and the trailing edge portion thereof consequently deflecting upwardly from the horizontal plane, by means of the deflections sensing and transmitting mechanism hereinabove described, the leading-edge section 131 is deflected relatively upwardly, effecting an increase in its angle of attack and in the airload thereon, while the upwardly deflected airfoil 140 has its angle of attack and its airload both decreased. The resultant counter-clockwise directed couple, viewed from the inboard end of the wing, relieves the wing of its twist, restoring the wing to its chordwise trim, and the positive differential between the positive lift of the larger-area section 131 and the negative lift of the airfoil 140 relieves the wing of its downward flexure about a chordwise axis of the wing, thus restoring the wing to its original trim in the spanwise direction.

The form of the invention which is illustrated in Figure 13 provides means, incorporating a minimum number of parts, whereby gust-loads are alleviated and whereby a pair of ailerons or other control surfaces may also be operated, either independently of the alleviator mechanism when the latter is not gust-deflected or overridingly of the alleviator mechanism when the latter is also operating.

To these ends, the construction comprises a torque-tube 175 disposed in vertical attitude in the wing's center-section 146, the tube's axis of rotation intersecting the longitudinal center line of the aircraft; that is, the tube is disposed "on center" with the longitudinal center line of the fuselage, not shown. Torque tube 175 also lies near the fore-and-aft center of the wing. Thus, no rotative, or other forces, as from unbalanced lateral forces, can affect the torque tube, contrary to the case that would exist were the torque tube located elsewhere.

Torque tube 175 is rotatably mounted in radial-bearing brackets 176 against each of which bears an antifriction thrust collar 147.

Projecting upwardly from a predetermined point on the forward portion of the periphery of the upper end of the torque tube is a pin 148. Pivotally attached to the pin 148, as by means of eyes, or loops 149 therein, is the inner end of each of a pair of laterally oppositely extending semi-rigid force-transmitting members 151. Preferably, the members 151 consist of a multi-strand metallic cable, to which is peripherally bonded a thin aluminum tube coextensive therewith to provide a semi-rigid, substantially inextensible member. If desired, one or both of the resultant semi-rigid rods may be longitudinally sectioned, the sections being united by a turnbuckle 152 for the purpose of enabling rigging changes.

A similar pin 153 is provided on the periphery of the lower end of the torque tube 175 at a point lying diametrically opposite the location of the first-said pin on the periphery of the torque-tube, that is, on the rear face of the torque tube. A pair of laterally-oppositely extending force-transmitting members 154 substantially coextensive with, and vertically spaced from members 151, has the inner end of each member pivotally engaging this pin.

Mounted in each pair of two pairs of brackets 155 carried on the rear face of a spar 156 and disposed in locations lying chordwise adjacent the ailerons 157, is one of a pair of vertically extending torque tubes, 158, 159. Each of these torque tubes bears a pair of pins 161, 162, the one pin 161 of each pair being located on the forward arc of the periphery of the upper end of each of the torque tubes, the other pin, 162, being disposed on the diametrically opposite point of the rearward arc of the periphery of the lower end of these torque tubes. The outer ends of the force-transmitting members 151 are pivotally attached to the upper pins 161 and the outer ends of the force-transmitting members 154 are similarly connected to the lower pins 162.

An actuating lever-arm 183 extends inboardwardly of the wing from each torque tube 158, 159 and the inner end of each arm 183 is pivotally attached to the forward end of an actuator link 164 which rearwardly terminates in pivotal connection with a horn 165 on the upper surface of each of the ailerons.

Upon occurrence of a gust that symmetrically loads the wings and upwardly deflects the starboard and the port portions thereof concurrently, the central torque tube 175, lying on the center line of the fuselage, undergoes no kind of deflection and, being also held against rotation by the equal and opposite reactions of the pilot's control cables 166 connected thereto as shown, serves as a stationary, rigid anchorage for the inner ends of the sensing members 151 and 154.

Accordingly, the outer ends of the upper sensing-elements 151, being free from the spar while the rotatable torque tubes 158 and 159 to which they are connected are fixedly attached to the spar and bodily move upwardly with same on an up-gust, in effect move relatively outwardly of the spar and therefore exert a counter-clockwise rotation producing force on the torque tube 159 and a clockwise rotation producing force on torque tube 158. The outer end of the lower sensing element similarly undergoes relative inward displacement with respect to the arcuately elongated lower edge of the up-bent spar and thus adds to the above rotation-producing forces.

This rotation of the outboard torque tubes, transmitted through arms 183 and links 164, elevates the ailerons simultaneously, which effects decrease in the effective camber of the wing and restores it to its original spanwise trim.

Upon occurrence of a gust directed downwardly on the wing, the aforedescribed parts undergo a reverse action in restoring the down flexed wing to its spanwise trim.

Means are provided whereby the ailerons can be operated differentially by the pilot, during the gust-caused deflections of the wing portions and either oppositely to the direction of alleviator action thereon by overriding same, or in the same direction and thus augmenting the alleviator action. These means consist of a pair of arms 167 rigidly fixed to an intermediate portion of the length of the central torque tube 175 and extending laterally oppositely therefrom for applying rotary motion in opposite directions to the torque tube. The cables 166 extend around an aileron operating pulley 168 located on the pilot's control column. Thus when the pilot actuates his wheel to effectuate aileron control in the conventional manner, the present alleviator system, either when active or inactive, permits normal operation of the ailerons.

Although a number of constructions embodying the invention have been shown and described in detail, it is to be understood that such has been done merely in order to clarify the invention and that these forms do not constitute the sole embodiments which the invention can take. In fact, and in law, the invention is capable of assuming any structural form lying within the scope of the subjoined claims which define the invention in terms of its essential constructional configurations.

We claim:

1. An aircraft airload reducing device, comprising: a substantially central aircraft body construction; a wing carried thereby and extending laterally therefrom; wing-bracing structure extending within said wing and secured thereto; said wing and bracing structure being sufficiently flexible to be gust-deflected about chordwise and spanwise axes in response to gusts thereon resulting in respective extensions and contractions of the upper and lower surfaces of said wing and bracing structure; elongate, mainly spanwise-extending, relatively inextensible, wing-deflection sensing means consisting entirely of a mechanical linkage operatively engaging said bracing structure, the one terminal-region of said sensing means being immobilized with respect to said structure and wing and the opposite end of said sensing means being free to move with respect to said structure in response to gust loads on the wing; movable lift-varying means movably carried by the wing; and force-transmitting means extending between said free opposite end of said sensing means and said lift-varying means and having opposite terminals respectively connected operatively to said free end and to said lift-varying means; said sensing means constituting the sole means of producing the motive force in the device to actuate said lift-varying means in response to wing-deformations, and transmitting the forces generated by the relative displacement of said sensing means and said bracing structure and by the fibre stresses generated in said sensing means by said extensions and contractions of said bracing means directly through said force-transmitting means to said lift-varying means for moving said lift-varying means, directly and substantially immediately in proportional response to said deflections, in senses and magnitudes adequate to effect aerodynamic corrections of said deflections.

2. An aircraft airload reducing device, comprising a substantially central aircraft-body construction; a wing carried thereby and extending laterally therefrom; wing-bracing structure extending within said wing and secured thereto; said wing and bracing structure being sufficiently flexible to be gust-deflected about chordwise and spanwise axes in response to gusts thereon resulting in respective extensions and contractions of the upper and lower surfaces of said wing and said bracing structure; elongate, mainly spanwise-extending, relative inextensible, wing-deflection sensing means consisting entirely of a mechanical linkage operatively engaging said bracing structure, the one terminal-region of said sensing means being immobilized with respect to said structure and wing and the opposite terminal-region of said sensing means being free to move bodily longitudinally relative to said structure in response to expansion and contraction of said bracing structure; movable wing-lift varying means movably carried by said wing; and force-transmitting means extending directly and substantially rectilinearly between said free opposite end of said sensing means and said lift-varying means for applying to said lift-varying means the aforesaid length-wise movement and said contractions and expansion; said sensing means constituting the sole instrumentality for producing the motive power that actuates said lift-varying means in response to wing deformations; said force-transmitting means including only solid, rigid linkage members and being devoid of internal-force generating means and liquid, and its motions effecting movements of said lift-varying means in senses and magnitudes adequate to produce aerodynamic corrections of said gust-caused deflections.

3. An aircraft airload reducing device, comprising: a substantially central aircraft-body construction; a wing carried thereby and extending laterally therefrom; wing-bracing structure extending within said wing and secured thereto; said wing and bracing structure being sufficiently flexible to be gust-deflected about chordwise and spanwise axes in response to gusts thereon resulting in respective extensions and contractions of the upper and lower surfaces of said wing and bracing structure; elongate, mainly spanwise extending, relatively inextensible, wing-deflection sensing means consisting entirely of a mechanical linkage operatively engaging said bracing structure, the one terminal-region of said sensing means being immobilized with respect to said structure and wing and the opposite terminal region of said sensing means being free to move bodily and substantially lengthwise relative to said structure and wing in response to expansions and contractions of said bracing structure cause by gust-loads; movable wing-lift varying means movably carried by said wing; and force-transmitting means extending directly and substantially rectilinearly between said free opposite end of said sensing means and said lift-varying means, said force-transmitting means including only solid, rigid linkage members and being devoid of internal-force generating means and liquid; the summated movements of said sensing means constituting the sole motive force in the device for actuating said lift-varying means in response to wing-deformations and being applied to said lift-varying means for directly and substantially immediately moving said means in direct proportional response to said wing deflections; said movements being directed in senses, and being in magnitudes, adequate to produce aerodynamic corrections of said gust-caused deflections.

4. An aircraft airload reducing device, comprising: a central section, a wing carried thereby and extending laterally therefrom; bracing structure extending spanwise within said wing and secured thereto; said wing and bracing structure being sufficiently flexible to be deflected bi-directionally in response to gust loads thereon resulting in respective spanwise extension and contraction of the upper and lower portions thereof; elongate, spanwise-extending relatively inextensible wing deflection sensing means consisting entirely of a mechanical linkage carried by said structure; one end of said means being anchored to said structure and the other end of said means being free to move with respect to said structure in response to and in accordance with the extension or contraction of the latter; movable lift-varying means carried by said wing; said sensing means constituting the sole instrumentality for producing the motive power to actuate said lift-varying means in response to wing deformations; and positive acting mechanical means directly and operatively connecting the relatively movable end of said sensing means to said lift varying means to directly effect movement of the latter in response to an in proportion to the relative movement of said end of said sensing means and in a direction to produce an aerodynamic opposition to the deflection of said wing.

5. A device as claimed in claim 4 and in which the combination of said sensing means, lift-varying means, and force-transmitting means are of a mass-weight and flexibility less than those of the combined wing and bracing structure and have a consequent natural vibration frequency substantially higher than the natural vibration frequency of the wing and bracing structure, said higher vibration frequency enabling said first-mentioned combination to complete its wing load relieving action well before the occurrence of maximum flexure of the wing and with an action-lag of substantially zero, thereby to substantially obviate "bumps" in the airplane's flight.

6. An aircraft airload reducing device, comprising: a central section; a wing carried thereby and extending laterally therefrom; bracing structure extending spanwise within said wing and secured thereto; said wing and bracing structure being sufficiently flexible to be deflected bi-directionally in response to gust loads thereon resulting in respective spanwise extension and contraction of the upper and lower portions thereof; elongate, spanwise-extending relatively inextensible wing deflection sensing means carried by said structure; the one terminal-region of said means being anchored to said structure and the other terminal-region of said means being free to move with respect to said structure in response to and in accordance with the extension or contraction of the latter; movable lift varying means carried by said wing; positive acting mechanical means directly and operatively connecting the relatively movable end of said sensing means to said lift varying means to move the latter in response to and in proportion to the relative movement of said end of said sensing means and in a direction to produce an aerodynamic opposition to the deflection of said wing; and pilot operated means movable to modify the action of said mechanical means to exert independent lift-control on said wing; said sensing means constituting the sole means of producing the motive power for actuating said lift-varying means in response to wing-deformations.

7. An aircraft airload reducing device comprising: a central section; a wing carried thereby and extending laterally therefrom; bracing structure extending spanwise within said wing and secured thereto; said wing and bracing structure being sufficiently flexible to be deflected bi-directionally in response to gust loads thereon resulting in respective spanwise extension and contraction of the upper and lower portions thereof; a pair of elongate, spanwise-extending relatively inextensible wing deflection sensing elements carried by said structure; one end of each of said sensing elements being anchored to said structure and the other free end of each of said elements being oppositely movable spanwise with respect to said structure in response to and in accordance with the extension or contraction of the latter; an elongate planar member pivotally mounted on said structure for rotation about a generally chordwise extending axis; the free ends of said sensing elements being connected to said elongate planar member at spaced points on opposite corners of its one end to rotate said elongate planar member about its pivotal axis in response to the relative spanwise movements of said elements and to move the opposite end of said elongate planar member in a generally vertical direction; movable lift varying means carried by said wing; and articulated, positively acting mechanical means directly and operatively connecting the vertically movable end of said member to said lift varying means to move the latter in response to the movement of said end of said member and in a direction to produce an aerodynamic opposition to the deflection of said wing, said sensing means consisting entirely of a mechanical linkage and constituting the sole means of producing the motive power to actuate said lift varying means.

8. An aircraft airload reducing device, comprising: a central structural portion; a wing carried thereby and extending laterally therefrom; bracing structure extending spanwise within said wing and secured thereto; said wing and bracing structure being sufficiently flexible to be deflected bi-directionally in response to gust loads thereon resulting in respective spanwise extensions and contractions of the upper and lower portions thereof; a rigid planar member having an outboard end and an inboard end and disposed longitudinally in adjacency to a portion of the length of said bracing structure and pivoted thereto near the inboard end of the planar member, the outboard end of said planar member being free to move in the wing-thicknesswise direction and arcuately with respect to said structure in response to, and in accordance with, the extensions and contractions of the latter; elongate, relatively inextensible members disposed longitudinally in adjacency to said structure and lying inboard of said planar member, the inboard ends of said inextensible members being anchored to said structure and the outboard ends of said inextensible members being pivotally connected to points at opposite corners of the inboard end of said planar member; movable wing-lift varying means movably carried by said wing and adapted to be moved by movements of said planar member; a substantially vertically extending lever mounted for rotation about a spanwise extending axis and lying intermediate said planar member and said lift-varying means; arcuate-to-rectilinear motion-converting means pivotally mounted in chordwise extending attitude in the wing adjacent the outboard end of said substantially vertically movable planar member and pivotally connected at its forward end to the outboard end of said planar member; a link pivotally connected at its forward end to the rearward end of said motion-converting means and pivotally connected at its rearward end to the lower end of said vertically extending lever; a triple-arm bell-crank type lever pivotally mounted in substantially horizontal attitude on said vertically extending lever for rotation in a horizontal plane and for swinging about the pivotal axis of said vertically extending lever; a link extending from pivotal connection to the median arm of said triple-arm lever into pivotal connection with said lift-varying means so as to enable movements of said planar member to effectuate movements of said lift-varying means in proportional response to gust-caused deflections of said wing and in gust-load-relieving directions; and pilot-operable means extending operatively from the other two arms of said triple-arm lever to the pilot's station to enable movements of said pilot-operable means to override the sensing-means actuations of said lift-varying means and rotate said triple arm bell crank lever in said horizontal plane and operate said lift-varying means as a control surface; said sensing means constituting the sole means of producing the power to actuate said lift-varying means in response to wing deformations.

9. An aircraft airload reducing device, comprising: a central structural portion; a wing carried thereby and extending laterally therefrom; bracing structure extending spanwise within said wing and secured thereto; said wing and bracing structure being sufficiently flexible to be deflected bi-directionally in response to gust loads thereon resulting in respective spanwise extensions and contractions of the upper and lower portions thereof; a rigid planar member having an outboard end and an inboard end and disposed longitudinally in adjacency to a portion of the length of said bracing structure and pivoted thereto near the inboard end of the planar member, the outboard end of said planar member being free to move in the wing-thicknesswise direction and arcuately with respect to said structure in response to, and in accordance with, the extensions and contractions of the latter; elongate, relatively inextensible members disposed longitudinally in adjacency to said structure and lying inboard of said planar member, the inboard ends of said inextensible members being anchored to said structure and the outboard ends of said inextensible members being pivotally connected to points at opposite corners of the inboard end of said planar member; movable wing-lift varying means movably carried by said wing and adapted to be moved by movements of said planar member; force-transmitting linkage-means operatively associating the outboard end of said planar member with said lift-varying means; said linkage-means having an arcuate-to-rectilinear motion converting member, connected with said outboard end; a member of said linkage means being pivotally so mounted in the wing for rotation about its vertical and its longitudinal axes and so connected in the linkage-means as to be selectively actuatable from an extraneous source independently of the planar-member connected portions of the linkage means and in train with the rest of the linkage means; and pilot-operable means connected to said member of said linkage means for enabling the pilot operable means to override the sensing-means-actuation of said lift-varying means and operate said lift-varying means as a control surface; the elongate members aforesaid acting as wing-deformations sensing-means and consisting entirely of a mechanical linkage; said wing-deformations sensing means also being the sole means of producing the motive power to actuate said lift-varying means in response to wing-deformations.

10. An aircraft airload reducing device, comprising: a substantially central body-construction; a wing carried thereby and extending laterally therefrom; a bracing structure extending spanwise within said wing and secured thereto, said wing and bracing structure being sufficiently flexible to be deflected bi-directionally in response to gust loads thereon resulting in respective spanwise extensions and contractions of the upper and lower portions thereof; elongate, spanwise extending, relatively inextensible, wing-deflections-sensing means carried by said structure, the inboard terminal-portion of said means being anchored to said structure and the opposite terminal portion being free to move bodily longitudinally with respect to said structure in proportional response to the extensions and contractions of the latter; a spoiler-flap hingedly nested in the upper surface of said wing near the medial portion thereof; a spoiler-flap hingedly nested in the lower surface of said wing near the medial portion thereof; and motion-transmitting means including portions extending substantially chordwise in said wing from said free end portion of said deflections-sensing means to each of said spoilers flaps, said portions being operatively connected at their forward ends to said deflections-sensing means and said portions being pivotally connected at their rearward ends to the adjacent one of said spoiler-flaps, said motion-transmitting means being spatially organized with the movement-directions of said free-end of said sensing means and with said spoiler flaps and so connected thereto as to effect elevation of the upper spoiler into the airstream sufficiently to decrease the lift of the wing when the latter is gust-deflected upwardly and so as to effect depression of the lower spoiler into the airstream to decrease the negative-lift of said wing when the latter is gust-deflected downwardly, thereby to correct the gust-caused deflections of said wing; said sensing means consisting entirely of a mechanical linkage and constituting the sole means of producing the motive power to actuate said spoiler-flaps.

11. An aircraft airload reducing device, comprising: a substantially central body-construction; a wing carried thereby and extending laterally therefrom; bracing structure extending spanwise within said wing and secured thereto, said wing and bracing structure being sufficiently flexible to be deflected bi-directionally in response to gust loads thereon resulting in respective spanwise extensions and contractions of the upper and lower portions thereof; elongate, spanwise extending relatively inextensible, wing deflection-sensing means carried by said structure, the one end-portions of said sensing means being anchored to said structure and the opposite end-portions of said sensing means being free to move with respect to said structure in proportional response to the extensions and contractions of the latter; a torque member rotatably mounted in substantially vertical attitude on said bracing structure, said torque member having an arm extending spanwise inboardly therefrom and the opposite end portions of said sensing means being pivotally connected to peripherally opposite portions of said torque member to rotate same; a triple-arm bellcrank mounted for rotation in substantially horizontal attitude in said wing rearwardly of said torque member; an alleviator-action response arm pivotally mounted coplanarly on the median arm of said triple-arm bellcrank and having its inner end normally on center with the bellcrank; pilot-operable means extending from each of the other two arms of the triple-arm bellcrank to the pilot's station; lift-varying means; a link connectedly extending from the outer portion of said alleviator-action responsive arm on said bellcrank to said lift-varying means; and a link connectedly extending from the inner end of said responsive arm to the spanwise extending arm on said torque member; whereby to enable transmittal of wing deflection-induced rotations of said torque member to said lift-varying means in the form of rectilinear forces; said sensing means constituting the sole means in the device for producing the motive power for actuating said lift-varying means in response to wing-deformations.

12. An aircraft airload reducing device, comprising: a substantially central body construction; a wing carried thereby and extending laterally therefrom, said wing and bracing structure being sufficiently flexible to be deflected bi-directionally in response to gust loads thereon which produce respective spanwise contractions and extensions of the upper and lower portions thereof, said wing including a separate, "floating" tip-portion pivotally mounted to the rest of the wing for rotation about a spanwise axis of said tip-portion; elongate, relatively inextensible, wing deflection-sensing means extending diagonally of the body portion of the wing from near the trailing edge thereof to near the leading edge thereof, the inner end-portions of said sensing means being anchored to the fuselage and the outer end-portions thereof being free to move lengthwise of said means and relatively to said bracing structure; vertically disposed, axially rotary means located at said outer end-portions and connected thereto for converting the gust-load induced movements of said end-portions into oscillatory motion about a vertical axis; and means pivotally connected to the last-said means for converting said oscillatory motion into rectilinear motion and transmitting said rectilinear motion to said wing-tip in proportional response to gust-induced wing deflections in such manner as to deflect said wing tip about its pivotal axis in directions and magnitudes adequate to effect aerodynamic corrections of said gust-induced wing deflections; said sensing means consisting entirely of a mechanical linkage and constituting the sole means of producing the motive power to actuate said wing-tip.

13. An aircraft airload reducing device, comprising: a substantially central aircraft-body portion; a wing carried thereby and extending laterally from each side of said body-portion; bracing structure extending within said wing and secured thereto, said wing and bracing structure being sufficiently flexible to be deflected in two opposite directions out of the wing's normal plane in response to gust loads thereon resulting in respective extensions and contractions of the upper and lower portions of the wing; a main torque tube rotatably mounted in substantially vertical attitude on the longitudinal center-line of said body-portion; a cranking-means for receiving forces adapted to rotate said torque tube disposed on opposite sides of the periphery of the tube at each end thereof and extending longitudinally outwardly from said tube, said tube being adapted to receive equal and opposite lateral forces for maintaining it normally irrotational thereby to constitute said tube an anchorage member; a pair of elongate, relatively inextensible, force-transmitting and wing deflections sensing members extending outwardly and oppositely in the wing from connection to each of said cranking means, the adjacent lateral pairs of elongate members being substantially coextensive and lying, in separation, in a substantially vertical plane; a torque tube rotatably mounted in vertical attitude outboardwardly of said main torque tube in each wing portion; a cranking-means disposed on opposite sides of the periphery of each of the outboard tubes at each end thereof and extending longitudinally outwardly therefrom; a connection between the outboard end of each of said elongate members and the adjacent cranking means whereby to enable differential longitudinal movements of the vertically spaced elongate members in each pair under wing flexures to effect rotations of each of the outboard torque tubes in response to said deflections; a lift-varying means movably carried by each of said laterally extending wing-portions; an actuator arm on each outboard torque tube; and a link pivotally connecting each of said arms to said lift varying means; said sensing means constituting the sole source of power for actuating said lift-varying means in response to wing deformations.

14. An aircraft airload reducing device, comprising: a substantially central aircraft-body portion; a wing carried thereby and extending laterally from each side of said body-portion; bracing structure extending within said wing and secured thereto, said wing and bracing structure being sufficiently flexible to be deflected in two opposite directions out of the wing's normal plane in response to gust loads thereon resulting in respective extensions and contractions of the upper and lower portions of the wing; a main torque tube rotatably mounted in substantially vertical attitude on the longitudinal center-line of said body-portion; a cranking-means for receiving forces adapted to rotate said torque tube disposed on opposite sides of the periphery of the tube at each end thereof and extending longitudinally outwardly from said tube, said tube being adapted to receive equal and opposite lateral forces for maintaining it normally irrotational thereby to constitute said tube an anchorage member; a pair of elongate, relatively inextensible, force-transmitting and wing deflections sensing members extending outwardly and oppositely in the wing from connection to each of said cranking means, the adjacent lateral pairs of elongate members being substantially coextensive and lying, in separation, in a substantially vertical plane; a torque tube rotatably mounted in vertical attitude outboardwardly of said main torque tube in each wing portion; a cranking-means disposed on opposite sides of the periphery of each of the outboard tubes at each end thereof and extending longitudinally outwardly therefrom; a connection between the outboard end of each of said elongate members and the adjacent cranking means whereby to enable differential longitudinal movements of the vertically spaced elongate members in each pair under wing flexures to effect rotations of each of the outboard torque tubes in response to said deflections; a lift-varying means movably carried by each of said laterally extending wing-portions; an actuator arm on each outboard torque tube; a link pivotally connecting each of said arms to said lift varying means; a lever arm extending laterally from each of two points on the periphery of said main torque tube, said points lying on laterally opposite sides of said torque tube; and a pilot-operable connection extending from each arm to the pilot's control column, said sensing means constituting the sole source of power for actuating said lift-varying means in response to wing deformations.

15. An aircraft airload reducing device, comprising: a body; a wing carried thereby and extending laterally therefrom, said wing comprising structure sufficiently flexible to be gust-deflected about chordwise and spanwise axes in response to gusts thereon resulting in respective extensions and contractions of the upper and lower portions of said wing structure; a movable, deflection corrective airfoil carried by said wing; an entirely mechanical relatively inextensible linkage extending mainly spanwise of said wing and having its one terminal-region immobilized with respect to said wing structure and the opposite terminal-region thereof being free to move with respect to said structure in response to gust loads on said wing; the aforesaid nature and mounting of said linkage dually causing said linkage to function both as a gust-load sensing means and as the sole means of producing a motive force in response to wing-deformations; and force-transmitting means extending connectively between said free end of the dual-nature sensing and motive-force producing means and said corrective airfoil; and said dual-nature means applying the wing deflection generated forces directly to said force-transmitting means so as to cause the latter to correctively deflect said corrective airfoil in proportional responses to the gust-caused wing loading and in senses and magnitudes such as to effect aerodynamic corrections of said deflections.

16. An aircraft airload reducing device, comprising: a major disposable-load carrying portion; a wing carried thereby and extending laterally therefrom; wing-bracing structure extending within said wing and secured thereto, the unit consisting of said wing and bracing structure being sufficiently flexible to deflect in response to gusts acting thereon so as to effect respective extensions and contractions of the upper and lower surfaces of said unit, wing-deflection sensing means comprising elongate, substantially spanwise extending substantially inextensible means operatively engaging said unit, the one end-portion of said elongate sensing means being immobilized with respect to said unit and the opposite end portion being free to move with respect to said unit in response to gust loads on the wing; lift-varying means operatively associated with the wing; and force-transmitting means extending between said free opposite end of said sensing means and said lift-varying means and having opposite terminals respectively connected operatively to said free opposite end and to said lift varying means; said sening means constituting the sole means in the device for producing the motive force to actuate the lift-varying means responsively to wing deformations; said sensing means being adapted to actuate said lift-varying means directly and in proportional response to the deflections of said unit and in senses and magnitudes adequate to effect corrections of said deflections.

17. An aircraft airload reducing device, comprising: a major disposable-load carrying portion; a wing carried thereby and extending laterally therefrom; wing-bracing structure extending within said wing and secured thereto, the unit consisting of said wing and bracing structure being sufficiently flexible to deflect in response to gusts acting thereon so as to effect respective extensions and contractions of the upper and lower surfaces of said unit; wing-deflection sensing means comprising elongate, substantially spanwise extending substantially inextensible means operatively engaging said unit, the one end-portion of said elongate sensing means being immobilized with respect to said unit and the opposite end-portion being free to move with respect to said unit in response to gust loads on the wing; lift-varying means operatively associated with the wing; and force-transmitting means extending between said free opposite end of said sensing means and said lift-varying means and having opposite terminals respectively connected operatively to said free opposite end and to said lift varying means; said force-transmitting means consisting substantially entirely of a mechanical linkage system including only solid, substantially rigid force-transmission members so operatively associated together as to enable said linkage to effect substantially immediate, zero-lag movements of said lift varying means, responsively to wing deflections, in senses and magnitudes adequate to produce corrections of said gust-caused deflections.

18. An aircraft airload reducing device, comprising: a major disposable-load carrying portion; a wing carried thereby and extending laterally therefrom; wing-bracing structure extending within said wing and secured thereto, the unit consisting of said wing and bracing structure being sufficiently flexible to deflect in response to gusts acting thereon so as to effect respective extensions and contractions of the upper and lower surfaces of said unit; wing-deflection sensing means comprising elongate, substantially spanwise extending substantially inextensible means operatively engaging said unit, the one end-portion of said elongate sensing means being immobilized with respect to said unit and the opposite end-portion being free to move with respect to said unit in response to gust loads on the wing; lift-varying means operatively associated with the wing; and force-transmitting means consisting of a linkage-system extending directly to said lift-varying means from said free opposite end of said sensing means and connected to both; said force-transmitting means including only solid, substantially rigid link-members and being adapted to transmit the displacements of the gust-deflected unit with respect to the sensing means substantially immediately and substantially free of time-lag to said lift-varying means so as to substantially immediately operate said latter means in direct proportional response to the wind deflections and in senses and magnitudes adequate to correct said gust-caused deflections.

19. A device as claimed in claim 17 and in which the combined mass-weight, and the flexibility, of said sensing means, lift-varying means and force-transmitting means are each less than the combined mass-weight, and the flexibility, of the wing-and-wing bracing unit, thereby to endow the combined sensing means, lift-varying means and force-transmitting means with a natural-vibration frequency sufficiently higher than the natural-vibration frequency of said wing-and-wing bracing unit as to enable the first-mentioned combination to complete its wing-load relieving action well before the occurrence of maximum wing-flexure, thereby to preclude the occurrence of "bumps" and vertical irregularities in the aircraft's flight path incident to gusts and the like.

References Cited in the file of this patent
UNITED STATES PATENTS

| | | |
|---|---|---|
| 1,806,379 | Wood | May 19, 1931 |
| 2,238,403 | Soderquist | Apr. 15, 1941 |
| 2,286,150 | Mercier | June 9, 1942 |
| 2,406,588 | Cornelius | Aug. 27, 1946 |